March 27, 1956  L. F. CARTER  2,739,390
DAMPING ERROR ELIMINATOR FOR GYRO COMPASSES
Filed Feb. 28, 1951
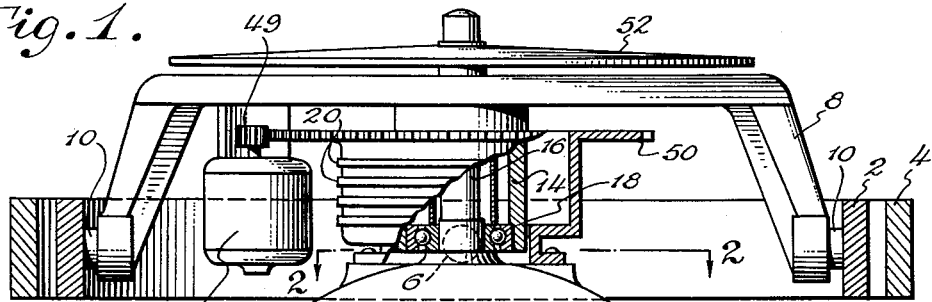
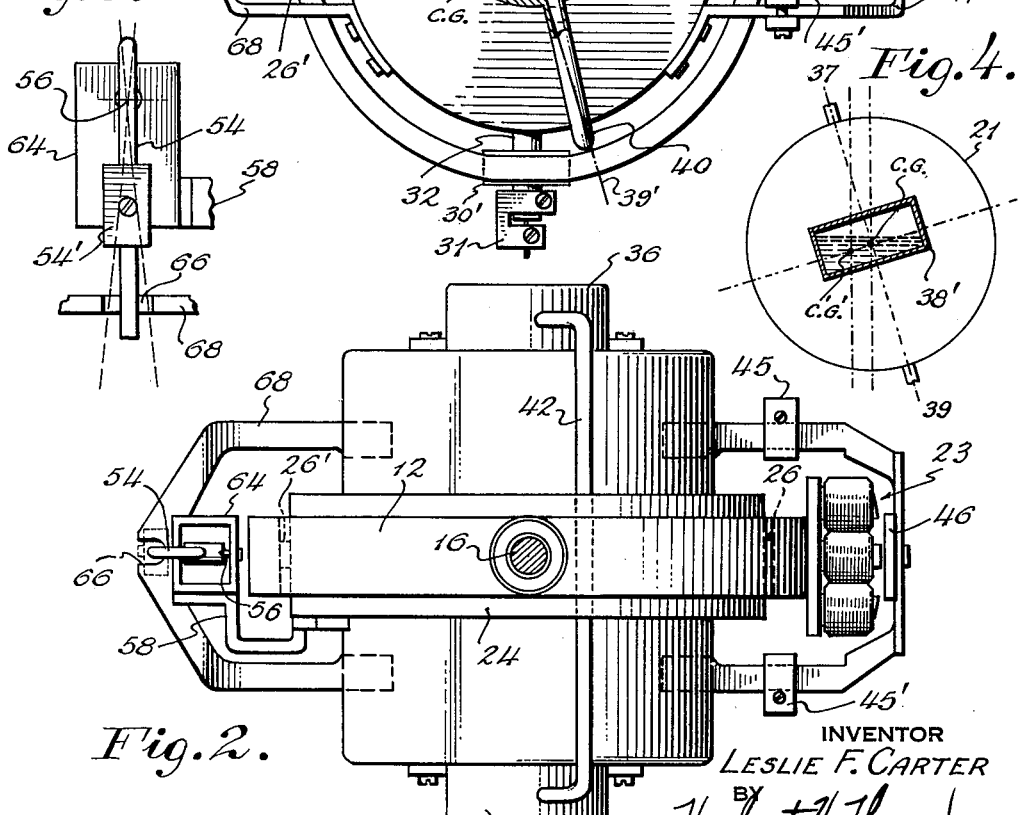
INVENTOR
LESLIE F. CARTER
BY
Herbert H. Thompson
HIS ATTORNEY

United States Patent Office 2,739,390
Patented Mar. 27, 1956

2,739,390

DAMPING ERROR ELIMINATOR FOR GYRO COMPASSES

Leslie F. Carter, Leonia, N. J., assignor to Sperry Rand Corporation, a corporation of Delaware Application February 28, 1951, Serial No. 213,262

5 Claims. (Cl. 33—226)

This invention relates to gyroscopic compasses and more particularly to means for avoiding the so-called damping error in gyroscopic compasses, which usually arises on changes of speed and course of the ship because of the effect of acceleration forces on the damping factor.

In one type of gyro compass, notably the type shown in the prior patent to Arthur L. Rawlings, No. 1,923,885, dated August 22, 1933, and also in the copending application of Leslie F. Carter for Gyro Compasses, (now Patent Number 2,682,115 issued June 29, 1954) the mounting of the sensitive element is such that the major axis of the compass is horizontal instead of vertical as in the usual compass. In this type of compass, the simplest form of damper is the provision of an unbalanced mass on the west side of the rotor case viewed in south elevation. Upon inclination of the compass, this mass applies a torque about the vertical axis in a direction to reduce the tilt. During changes of speed or course, however, the acceleration forces acting on this mass about the vertical axis cause a slight tilt of the compass which subsequently causes deviation and it is to the prevention of this error that the present invention is directed.

According to my invention, I provide a counteracting means responsive to the presence of such acceleration forces for exerting an equal and opposite torque about the vertical axis of the compass, which, at the same time, does not interfere with the normal function of the damper in applying a damping torque upon inclination of the rotor case.

A further object of the invention is to improve the construction of the containers for the liquid ballistic to reduce the errors incident thereto during rolling and pitching and on E-W acceleration.

Referring to the drawings illustrating one form my invention may assume,

Fig. 1 is a north elevation, looking south, partly in section of a gyro compass with my invention applied thereto;

Fig. 2 is a transverse section looking down, taken approximately on line 2—2 of Fig. 1;

Fig. 3 is a side elevation on a larger scale of the pendulum employed to eliminate the damping error; and Fig. 4 is a diagram showing the distribution of liquid in a rectangular container as employed in the prior art.

The gyro compass is shown as supported in the usual gimbal ring 2 within the binnacle ring 4 on a trunnion axis 6 normal to the paper in Fig. 1. The compass spider 8 is pivoted within the gimbal 2 on a second trunnion axis 10. The follow-up element or phantom 12 of the compass is journalled for rotation about a vertical axis within a downwardly extending housing 14 of the spider 8, the phantom 12 being shown as having upwardly extending stub-shaft 16 journalled in spaced bearings 18 in the spider. Slip rings 20 are shown for leading current into the spinning motors (not shown) within rotor case 21 and follow-up controller 23, the follow-up motor being shown at 22.

In the type of compass selected, the major pivotal axis between the spider and sensitive element is horizontal instead of vertical as in the usual gyro compass. Therefore, the vertical ring 24 is journalled on the spider 8 on normally horizontal trunnions 26, 26'. The rotor case 21 is journalled in the vertical ring in normally vertical bearings 30, 30'. The shaft 32 forming the trunnions for such bearings is shown as extending above and below the rotor case within which it is rigidly clamped. Said shaft is made hollow or in the form of a tube 32 through which extends the torsion suspension 34 by means of which the rotor case is suspended from the top of the vertical ring. The suspension wire 34 is anchored at the top to the vertical ring and at the bottom to a block 31 secured to the bottom of tube 32, as described more in detail in the aforesaid Carter application.

Meridian seeking properties may be imparted to the compass by a liquid ballistic arrangement such as liquid containers 36, 38, which are preferably secured to the two ends of the rotor case and are connected both at the top and bottom by pipes 40 and 42. The containers themselves are preferably made circular in cross section to avoid an error which arises when a long rectangular container is employed, such as shown in the aforesaid prior Rawlings patents. This error is due to the E-W shift of the center of gravity of the liquid in said containers in the presence of tilt about a N-S axis or acceleration having E-W components.

As shown in Fig. 4, the center of gravity of the liquid will shift to the left from C. G. to C.' G.' when the compass is tilted counterclockwise as shown by dotted line 37—39 and a rectangular container 38' is employed, but as shown in Fig. 1 with circular containers, each partially filled with enough liquid to normally place the surface thereof slightly above the axis or middle of each container, but with the containers mounted with their horizontal axes sufficiently above the axis 26, 26' of the gyroscope to keep the center of gravity of the liquid normally in the horizontal plane of axis 26, 26', the center of gravity of the liquid will remain substantially unaffected by such inclination (see line 37', 39'). This is especially important in gyro compasses of the type referred to since E-W shift of the center of gravity causes an unwanted torque about the vertical axis causing a tilt with subsequent straying from the meridian. The subject matter of this aspect of the invention is being covered by divisional or a continuation-in-part application.

The damping in this type compass, as above stated, is effected by having the west side of the compass case slightly heavier than the east side. This is represented in the drawings by showing mass 44 secured to the west side of the compass, although the same function may be effected in whole or in part by utilizing the excess mass of the armature 46 of follow-up controller or pick-off 23. Adjustability may readily be obtained by utilizing adjustable masses 45, 45' clamped on arm 47 of controller 46 for this purpose. This controller is shown as of the E-inductive or vario-transformer type, the output of which is fed through an amplifier (not shown) to control the follow-up motor 22, which rotates the follow-up ring or phantom 12 through pinion 49 and azimuth gear 50, to which the compass card 52 may also be secured.

To prevent acceleration forces acting on the damping mass from causing a tilt of the case, I have shown a pendulum 54 or countermass pivoted at 56 to an arm 58 secured to and extending from the vertical ring 24. The pendulum is shown as having a U-shaped frame, one end of which is provided with a damping paddle 60 which is immersed within damping liquid 62 in container 64 on arm 58 and within which the pendulum is pivoted.

The outer arm of the pendulum is provided with an adjustable mass 54' so that the pendulosity and period may be varied at will. The lower end of the pendulum is shown as passing through a fork or U-shaped slot 66 in an arm 68 secured to the rotor case 21. The slot is preferably somewhat broader than the width of the pendulum to provide a predetermined amount of lost motion sufficient to assure freedom of the pendulum without engaging the fork for all normal meridian seeking operations of the compass. In other words, the clearance is sufficient so that the pendulum will not contact the fork for any tilts normally encountered in the settling of the compass on the meridian, nor from the relative swinging of the pendulum and compass during rolling and pitching of the ship, since the pendulum is pivoted on the stabilized vertical ring 24 and is heavily damped, and arm 68 is connected to the stabilized rotor case 21. Even if the side of the slot were momentarily contacted, such engagement would be of short duration and would normally be cancelled by alternate engagement on the opposite side during rolling and pitching.

However, acceleration forces such as due to change of speed or turning of the ship produce materially greater displacement of the pendulum upon which the lower end thereof will contact one side or the other of the fork during the persistence of such a force and thereby exert a torque on the rotor case about the vertical axis equal and opposite to that exerted by the unbalanced mass 44. In this manner, error due to acceleration of the ship, i. e., during turns or speed changes having a N-S component, is avoided. At the same time, normal damping action is not interfered with during normal tilts of the rotor case, since at this time the pendulum does not contact the fork and its mass is entirely supported by the vertical ring which is positioned in azimuth by the follow-up system and therefore does not react upon the gyro casing about its vertical axis.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A ship's gyro compass having a follow-up support, a vertical ring pivoted therein, a rotor case pivoted in the vertical ring, and a damper for said compass adapted to exert a torque about the vertical axis upon tilt to reduce the tilt, means for reducing the compass error otherwise caused by such damper during turns or changes of speed of the ship comprising a pendulum pivoted on said compass and normally hanging free, and a coupling having a lost motion connection between said pendulum and case for imparting a torque from said pendulum to said case about said vertical axis opposing the aforesaid damping torque when the relative tilt therebetween exceeds the limits of said lost motion, whereby said coupling only applies such opposing torque during changes in speed or course of the ship.

2. A ship's gyro compass having a follow-up support, a vertical ring pivoted therein on a horizontal axis, and a rotor case pivoted in the vertical ring on a vertical axis, an eccentric damper for said compass adapted to exert a torque about the vertical axis upon tilt to reduce the tilt, pendulous means pivoted on the vertical ring, damping means for the pendulous means whereby said means is stabilized from the gyro for short period rolling and pitching of the ship, a lost motion coupling between said pendulous means and said case capable of transmitting from said pendulous means to said case an equal and opposite torque about said vertical axis upon contact between said pendulous means and coupling whereby an opposing torque is exerted on the case only during changes in speed or course of the ship.

3. Means for reducing damping errors in ship's gyro-compasses damped by being made heavy on the west side, the combination with a gyro-compass having a follow-up support, a vertical ring pivoted therein on an E-W axis, and a rotor case pivoted in said ring on a vertical axis, a pendulum pivoted on the east side of said ring, and a member secured to said case and having a lost motion engagement with said pendulum, the extent of such lost motion being such that no engagement effectively takes place except during acceleration of the ship.

4. Means for reducing damping errors in ship's gyro-compasses damped by being made heavy on the west side, the combination with a gyro-compass having a follow up support, a vertical ring pivoted therein on an E-W axis, and a rotor case pivoted in said ring on a vertical axis, a liquid container secured to the east side of said ring, a pendulum pivoted thereto and having a part dipping in the liquid in said container to damp the same, and a member secured to said case and having a lost motion engagement with said pendulum, the extent of such lost motion being such that no engagement effectively takes place except during acceleration of the ship.

5. Means for reducing damping errors in ship's gyro-compasses damped by being made heavy on the west side, the combination with such a gyro-compass having a follow up support, a vertical ring pivoted therein on an E-W axis, a rotor case pivoted on said ring on a normally vertical axis, a gravitationally responsive element mounted on the east side of said vertical ring tending to move in response to acceleration forces having a N-S component, damping means for suppressing such movement when such forces are of intermittent duration, and a connection between said gravitational element and said rotor case for imparting a torque to said rotor case about said vertical axis only upon relative long continued acceleration forces such as due to continuing changes in speed or course of the ship.

References Cited in the file of this patent

UNITED STATES PATENTS

| | | |
|---|---|---|
| 1,679,438 | Mills | Aug. 7, 1928 |
| 1,687,970 | Corliss | Oct. 16, 1928 |
| 1,709,395 | Gillmor | Apr. 16, 1929 |
| 1,784,348 | Gillmor et al. | Dec. 9, 1930 |
| 1,854,869 | Thompson | Apr. 19, 1932 |
| 1,923,885 | Rawlings | Aug. 22, 1933 |
| 2,249,345 | Braddon | July 15, 1941 |
| 2,406,879 | Wittkuhns et al. | Sept. 3, 1946 |
| 2,419,948 | Haskins | May 6, 1947 |